United States Patent
Takagi

(10) Patent No.: US 9,182,650 B2
(45) Date of Patent: Nov. 10, 2015

(54) ACTION CONTROL DEVICE, ACTION CONTROL METHOD, IMAGING DEVICE, AND PROGRAM

(71) Applicant: Sony Corporation, Tokyo (JP)

(72) Inventor: Yoshimitsu Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/350,203

(22) PCT Filed: Oct. 11, 2012

(86) PCT No.: PCT/JP2012/076350
§ 371 (c)(1),
(2) Date: Apr. 7, 2014

(87) PCT Pub. No.: WO2013/058166
PCT Pub. Date: Apr. 25, 2013

(65) Prior Publication Data
US 2014/0247386 A1   Sep. 4, 2014

(30) Foreign Application Priority Data
Oct. 18, 2011   (JP) .................................. 2011-228540

(51) Int. Cl.
| | |
|---|---|
| H04N 5/235 | (2006.01) |
| G03B 7/00 | (2014.01) |
| G03B 9/02 | (2006.01) |
| G03B 11/00 | (2006.01) |
| H04N 5/225 | (2006.01) |
| H04N 5/232 | (2006.01) |
| H04N 5/238 | (2006.01) |
| G02F 1/01 | (2006.01) |
| G02F 1/133 | (2006.01) |
| G03B 7/0805 | (2014.01) |
| G03B 7/22 | (2006.01) |

(52) U.S. Cl.
CPC ................ *G03B 7/00* (2013.01); *G02F 1/0121* (2013.01); *G02F 1/13318* (2013.01); *G03B 7/0805* (2013.01); *G03B 7/22* (2013.01); *G03B 9/02* (2013.01); *G03B 11/00* (2013.01); *H04N 5/225* (2013.01); *H04N 5/238* (2013.01); *H04N 5/23212* (2013.01); *H04N 5/2254* (2013.01)

(58) Field of Classification Search
CPC ......................................... H04N 5/235–5/2358
USPC ............................................... 348/221.1, 362
See application file for complete search history.

(56) References Cited

U.S. PATENT DOCUMENTS

| | | | | |
|---|---|---|---|---|
| 6,720,995 | B1 * | 4/2004 | Kaneda et al. ............. | 348/208.8 |
| 7,199,830 | B1 * | 4/2007 | Tanaka et al. .............. | 348/362 |
| 2002/0012064 | A1 * | 1/2002 | Yamaguchi .................... | 348/362 |
| 2007/0065135 | A1 * | 3/2007 | Takei et al. ..................... | 396/241 |

FOREIGN PATENT DOCUMENTS

| | | |
|---|---|---|
| JP | 11-344673 A | 12/1999 |
| JP | 2003-087801 A | 3/2003 |

(Continued)

*Primary Examiner* — Anthony J Daniels
(74) *Attorney, Agent, or Firm* — Sony Corporation

(57) ABSTRACT

According to the first aspect of the present technology, there is provided an action control device, including a transmittance specifying unit configured to specify a transmittance of a variable-transmittance neutral density (ND) filter having a transmittance that varies according to an applied voltage, and an applied voltage control unit configured to control a voltage to be applied to the variable-transmittance ND filter such that the transmittance specified by the transmittance specifying unit is obtained. The applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given.

12 Claims, 9 Drawing Sheets

(56) References Cited

FOREIGN PATENT DOCUMENTS

| | | | |
|---|---|---|---|
| JP | 2003-322878 A | 11/2003 | |
| JP | 2005-025121 A | 1/2005 | |
| JP | 2006-081039 A | 3/2006 | |

\* cited by examiner

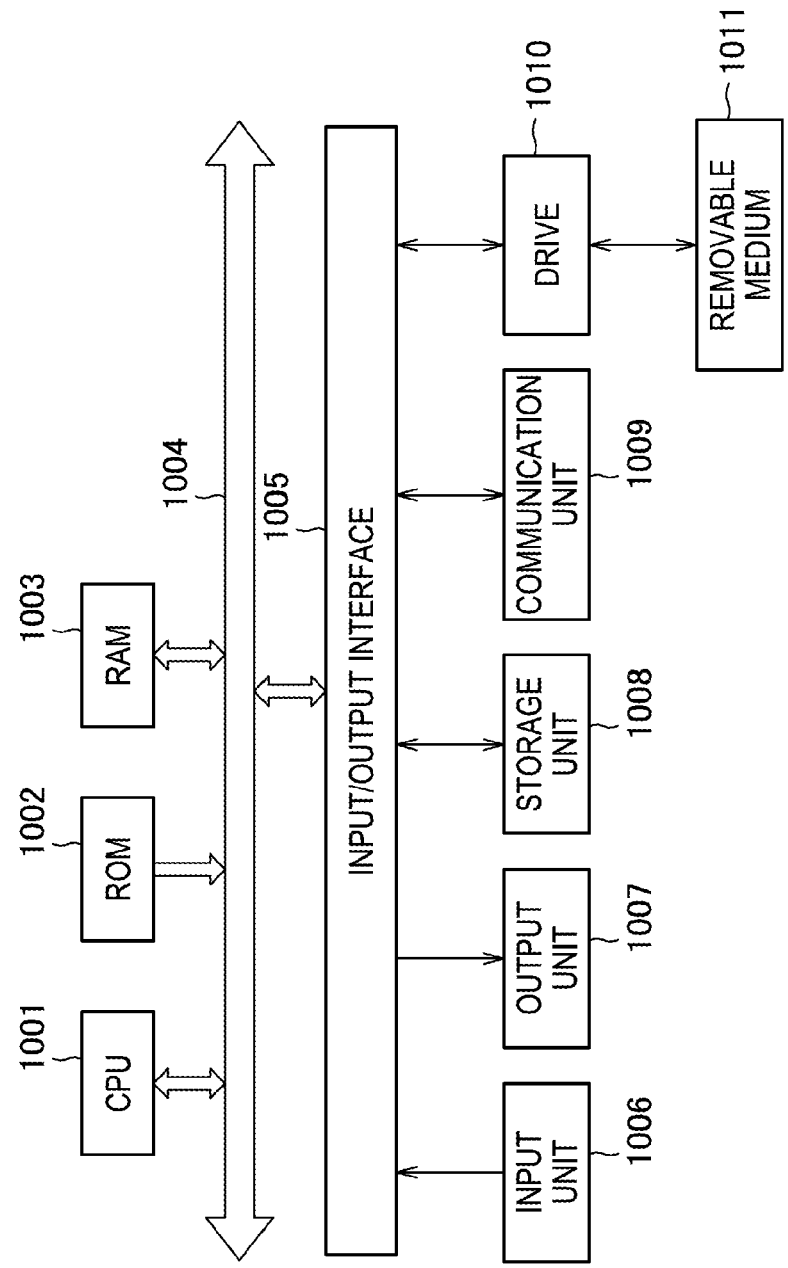

ACTION CONTROL DEVICE, ACTION CONTROL METHOD, IMAGING DEVICE, AND PROGRAM

TECHNICAL FIELD

The present technology relates to an action control device, an action control method, an imaging device, and a program, and more particularly to an action control device, an action control method, an imaging device, and a program which are capable of reducing a focus lag.

BACKGROUND ART

In recent years, in the field of compact digital cameras, as the density of pixels of an image sensor increases, there are cases in which a sense of resolution deteriorates due to the influence of a small aperture blur.

In this regard, employment of a neutral density (ND) filter (variable-transmittance ND filter) that implements a desired transmittance without an aperture being changed by an applied voltage has been studied. Among ND filters, for example, a liquid crystal ND filter is used to reduce a drastic change in exposure and thus reduce an observer's fatigue by changing a transmittance when a light quantity drastically changes in an eyepiece image at the time of switching of an objective lens (see Patent Literature 1).

CITATION LIST

Patent Literature

Patent Literature 1: JP H11-344673A

SUMMARY OF INVENTION

Technical Problem

However, in the case in which the exposure is controlled by changing the transmittance through the liquid crystal ND filter, when the temperature of the liquid crystal ND filter is low, a response speed of a liquid crystal decreases. For this reason, for example, at a timing at which a shutter button is pressed halfway so that auto focus (AF) is activated before imaging, control of the exposure by the liquid crystal ND filter is likely to be delayed, and thus a focus lag may increase.

It is desirable to provide a technique capable of reducing a focus lag that is caused by a decrease in a response speed of an ND filter that changes a transmittance according to an applied voltage.

Solution to Problem

According to the first aspect of the present technology, there is provided an action control device, including a transmittance specifying unit configured to specify a transmittance of a variable-transmittance neutral density (ND) filter having a transmittance that varies according to an applied voltage, and an applied voltage control unit configured to control a voltage to be applied to the variable-transmittance ND filter such that the transmittance specified by the transmittance specifying unit is obtained. The applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given.

The action control device may further include an imaging unit configured to image an image through the variable-transmittance ND filter, a transmittance calculating unit configured to calculate an appropriate transmittance of the variable-transmittance ND filter based on brightness of the image imaged by the imaging unit, and an applied voltage storage unit configured to store an applied voltage corresponding to a transmittance of the variable-transmittance ND filter. The applied voltage control unit performs control such that, among applied voltages stored in the applied voltage storage unit, an applied voltage corresponding to the appropriate transmittance calculated by the transmittance calculating unit is applied to the variable-transmittance ND filter.

The action control device may further include an operating unit configured to be operated when an imaging preparation instruction or an imaging instruction for an image to be imaged by the imaging unit is given. The transmittance specifying unit specifies a transmittance at a certain timing after the applied voltage control unit starts to apply the applied voltage to the variable-transmittance ND filter. The applied voltage control unit performs control such that, among applied voltages that are stored in the applied voltage storage unit and correspond to transmittances of the variable-transmittance ND filter, an applied voltage corresponding to the transmittance specified by the transmittance specifying unit is applied to the variable-transmittance ND filter at a timing at which an operation to give the imaging preparation instruction is performed on the operating unit.

The action control device may further include a response characteristic data storage unit configured to store response characteristic data of a transmittance of the variable-transmittance ND filter that occurs in time series until control from a second voltage from which control of an applied voltage starts to a first voltage is completed when the applied voltage control unit controls the applied voltage to be the first voltage, and an elapsed time measuring unit configured to measure an elapsed time that has elapsed after the applied voltage control unit starts to control the applied voltage. The transmittance specifying unit specifies a transmittance corresponding to an elapsed time that has elapsed until the operation to give the imaging preparation instruction is performed on the operating unit after the applied voltage control unit starts to apply the applied voltage to the variable-transmittance ND filter, as a transmittance at the timing at which the operation to give the imaging preparation instruction is performed on the operating unit, based on the elapsed time measured by the elapsed time measuring unit and the response characteristic data stored in the response characteristic data storage unit.

The action control device may further include a temperature measuring unit configured to measure a temperature of the variable-transmittance ND filter. The response characteristic data storage unit stores response characteristic data of a transmittance of the variable-transmittance ND filter that occurs in time series until control from a second voltage from which control of an applied voltage starts to a first voltage is completed when the applied voltage control unit controls the applied voltage to be the first voltage for each temperature of the variable-transmittance ND filter, and the transmittance specifying unit specifies a transmittance corresponding to an elapsed time that has elapsed until the operation to give the imaging preparation instruction is performed on the operating unit after the applied voltage control unit starts to apply the applied voltage to the variable-transmittance ND filter, as a transmittance at the timing at which the operation to give the imaging preparation instruction is performed on the operating unit, based on the elapsed time measured by the elapsed time measuring unit, the response characteristic data stored in the response characteristic data storage unit, and the temperature of the variable-transmittance ND filter measured by the temperature measuring unit.

The action control device may further include a light quantity measuring unit configured to measure light quantities of front and rear portions of the variable-transmittance ND filter. The transmittance specifying unit specifies a transmittance at the timing at which the operation to give the imaging preparation instruction is performed on the operating unit after the applied voltage control unit starts to apply the applied voltage to the variable-transmittance ND filter, based on the light quantities of the front and rear portions of the variable-transmittance ND filter measured by the light quantity measuring unit.

The action control device may further include a gain control unit configured to control a gain of an image to be imaged by the imaging unit, and a shutter control unit configured to control a light blocking speed for blocking light incident on the imaging unit at a timing at which an image is imaged by the imaging unit. The gain of the imaging unit and the light blocking speed or either of them are controlled by the gain control unit and the shutter control unit so that optimal brightness is obtained when brightness based on the transmittance acquired by the transmittance specifying unit is higher or lower than optimal brightness at which the imaging unit images an image.

The variable-transmittance ND filter may be a liquid crystal ND filter.

The transmittance of the variable-transmittance ND filter may increase or decrease as the applied voltage increases.

According to the first aspect of the present technology, there is provided an action control method of an action control device, including a step of performing a transmittance specifying process of specifying a transmittance of a variable-transmittance neutral density (ND) filter having a transmittance that varies according to an applied voltage, and a step of performing an applied voltage control process of controlling a voltage to be applied to the variable-transmittance ND filter such that the transmittance acquired in the transmittance specifying process is obtained. The applied voltage control process controls the voltage to be applied to the variable-transmittance ND filter such that the transmittance of the variable-transmittance ND filter specified by the transmittance specifying process is maintained at a timing at which an imaging preparation instruction or an imaging instruction is given.

According to the first aspect of the present technology, there is a program causing a computer to function as: a transmittance specifying unit configured to specify a transmittance of a variable-transmittance neutral density (ND) filter having a transmittance that varies according to an applied voltage, and an applied voltage control unit configured to control a voltage to be applied to the variable-transmittance ND filter such that the transmittance specified by the transmittance specifying unit is obtained. The applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given.

According to the second aspect of the present technology, there is an imaging device, including a transmittance specifying unit configured to specify a transmittance of a variable-transmittance neutral density (ND) filter having a transmittance that varies according to an applied voltage, and an applied voltage control unit configured to control a voltage to be applied to the variable-transmittance ND filter such that the transmittance specified by the transmittance specifying unit is obtained. The applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given.

In the first and second aspects of the present technology, a transmittance of a variable-transmittance neutral density (ND) filter having a transmittance that varies according to an applied voltage is specified, a voltage applied to the variable-transmittance ND filter is controlled such that the specified transmittance is obtained, and a voltage applied to the variable-transmittance ND filter is controlled such that the transmittance of the variable-transmittance ND filter is maintained at a timing at which an imaging preparation instruction or an imaging instruction is given.

The action control device or the imaging device according to the present technology may be an independent device or may be a block that performs an action control process or an imaging process.

Advantageous Effects of Invention

According to the present technology, it is possible to reduce a focus lag.

BRIEF DESCRIPTION OF DRAWINGS

FIG. 9 is a diagram for describing an exemplary configuration of a general-purpose personal computer.

DESCRIPTION OF EMBODIMENTS

Hereinafter, modes (hereinafter referred to as "embodiments") for carrying out the invention will be described. The following description will proceed in the following order.

1. First embodiment (example in which transmittance is estimated)

2. Second embodiment (example in which transmittance is measured)

1. First Embodiment

Figure 1:
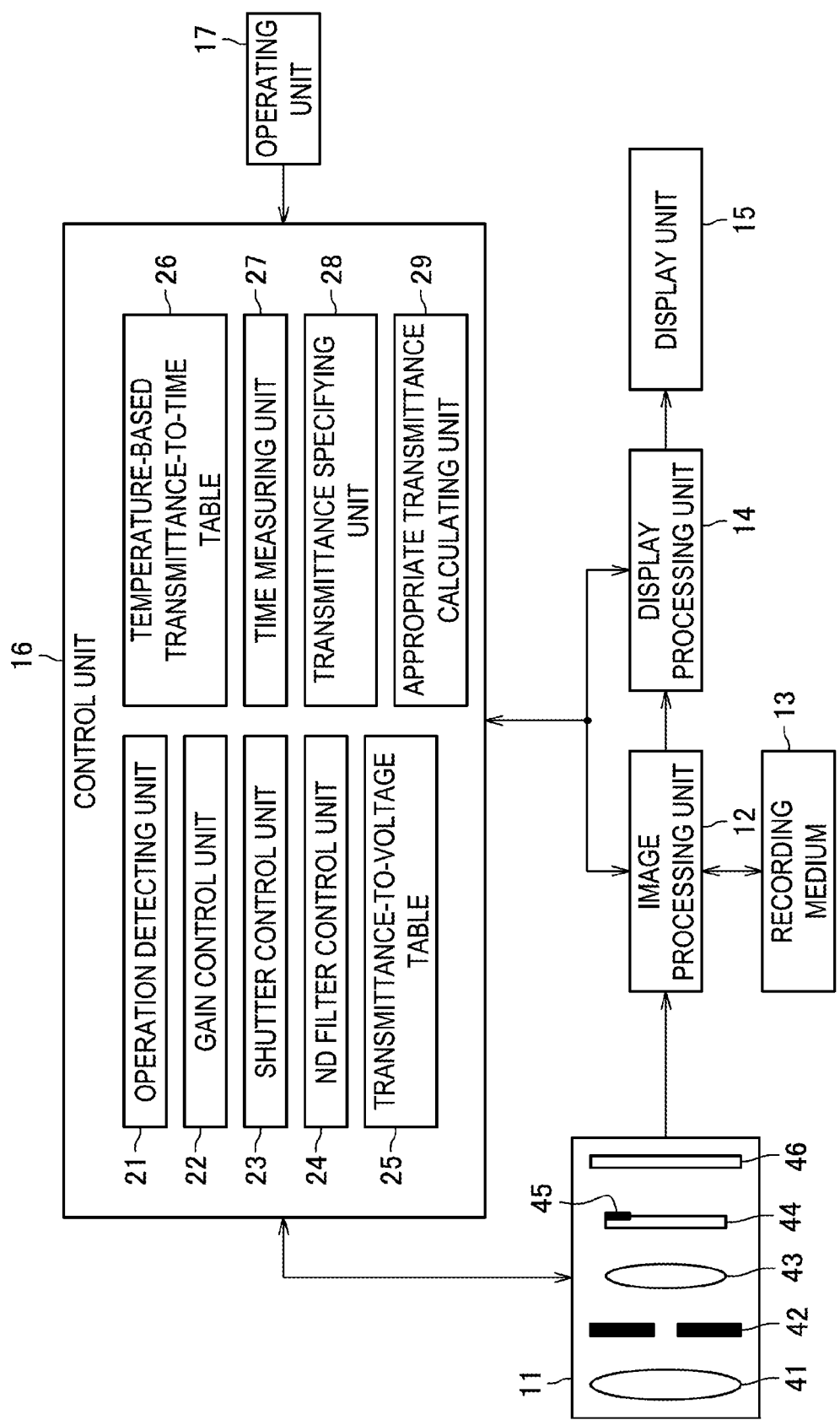
FIG. 1 is a diagram illustrating an exemplary configuration of an imaging device according to a first embodiment of the present technology.

Exemplary Configuration of Imaging Device According to First Embodiment of Present Technology FIG. 1 is a diagram for describing an exemplary configuration of an imaging device according to a first embodiment of the present technology. The imaging device of FIG. 1 includes a lens barrel 11, an image processing unit 12, a recording medium 13, a display processing unit 14, a display unit 15, a control unit 16, and an operating unit 17, and causes an image imaged by an imaging element 46 installed in the lens barrel 11 to be recorded in the recording medium 13 or to be displayed on the display unit 15. More specifically, when a half push operation representing imaging preparation is performed on the operating unit 17 including a shutter button or the like, the control unit 16 controls the lens barrel 11 such that a focus is controlled. Then, when a full push operation representing an imaging instruction is performed on the operating unit 17 including the shutter button or the like, the control unit 16 controls the lens barrel 11 such that an image is imaged. Then, the lens barrel 11 supplies the imaged image to the image processing unit 12 as an image signal. The image processing unit 12 performs certain processing on the image signal such as a process of compressing the image signal in a certain data format, and records the resultant data in the recording medium 13. Alternatively, the image processing unit 12 performs certain processing on the imaged image signal, supplies the resultant data to the display processing unit 14, and causes the data to be displayed on the display unit 15 including a liquid crystal display (LCD) or the like.

More specifically, the lens barrel 11 includes a zoom lens 41, a diaphragm 42, a focus lens 43, a liquid crystal ND filter 44, a thermistor 45, and the imaging element 46, and causes an image of a subject (not shown) to be formed in the imaging element 46 through the zoom lens 41, and the focus lens 43. Then, the imaging element 46 images the formed subject image, and outputs the imaged subject image as an image signal. Further, the control unit 16 controls the diaphragm 42 such that the diaphragm 42 adjusts a light quantity incident on the lens barrel 11. The liquid crystal ND filter (liquid crystal variable-transmittance ND filter) 44 adjusts a light quantity incident on the imaging element 46 by changing the transmittance by a voltage supplied to the control unit 16. The diaphragm 42 and the liquid crystal ND filter 44 are basically the same in purpose. However, the liquid crystal ND filter 44 can adjust a light quantity (illuminance) by uniformly changing the transmittance in the lens barrel 11, but it is difficult for the liquid crystal ND filter 44 to cope with a drastic change since the liquid crystal ND filter 44 changes the transmittance by the liquid crystal. Meanwhile, since the diaphragm 42 adjusts a light quantity by opening and closing an aperture portion, it is difficult to adjust a light quantity uniformly, but it is possible to adjust a light quantity at a high speed. The thermistor 45 measures the temperature of the liquid crystal ND filter 44, and supplies the measured temperature to the control unit 16. The imaging element 46 includes, for example, a charge coupled device (CCD), a complementary metal oxide semiconductor (CMOS), or the like, is controlled by the control unit 16 to image an image, and outputs the imaged image as an image signal.

The control unit 16 is configured with a micro computer or the like, and controls overall operation of the imaging device. More specifically, the control unit 16 includes an operation detecting unit 21, a gain control unit 22, a shutter control unit 23, an ND filter control unit 24, a transmittance-to-voltage table 25, a temperature-based transmittance-to-time table 26, a time measuring unit 27, a transmittance specifying unit 28, and an appropriate transmittance calculating unit 29. The operation detecting unit 21 detects a half push operation representing an imaging preparation instruction or a full push operation representing an imaging instruction based on an operation signal from the operating unit 17, and outputs a corresponding detection signal. The gain control unit 22 performs control such that the imaging element 46 has a gain of an appropriate state. The shutter control unit 23 appropriately controls the shutter speed when the imaging element 46 performs imaging. The ND filter control unit 24 controls the transmittance of the liquid crystal ND filter 44 by controlling a voltage applied to the liquid crystal ND filter 44. The transmittance-to-voltage table 25 is a table representing a relation between the transmittance of the liquid crystal ND filter 44 and an applied voltage. Thus, when the liquid crystal ND filter 44 is set to a certain transmittance, the ND filter control unit 24 reads an applied voltage corresponding to the certain transmittance with reference to the transmittance-to-voltage table 25, and controls the liquid crystal ND filter 44 according to the read applied voltage. Here, since it is sufficient if a necessary applied voltage is obtained from a transmittance, a configuration capable of calculating an applied voltage through a function capable of calculating an applied voltage from a transmittance may be used instead of the transmittance-to-voltage table 25.

The temperature-based transmittance-to-time table 26 stores a relation between an elapsed time from a timing at which an applied voltage is changed and applied when an applied voltage is changed to control the transmittance of the liquid crystal ND filter 44 and a transmittance in the elapsed time as a table for each temperature of the liquid crystal ND filter 44.

Figure 2:
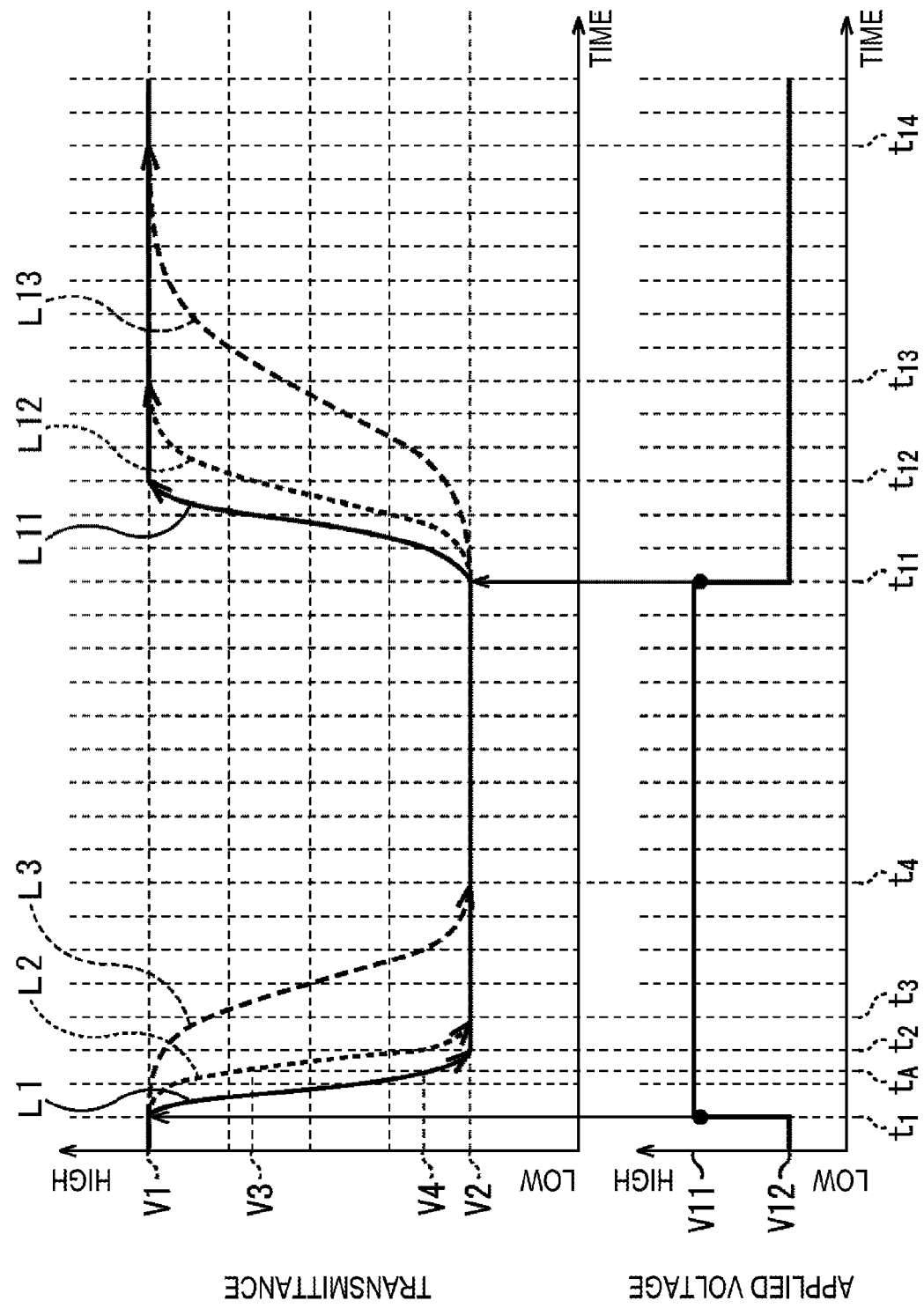
FIG. 2 is a diagram for describing transmittance characteristics according to an elapsed time from a timing at which a voltage is applied to a liquid crystal ND filter.

In other words, for example, when an applied voltage is changed from a voltage V12 to a voltage V11 (>V12) and then applied as illustrated by a waveform of an applied voltage at a time t1 in the lower part of FIG. 2, if the temperature of the liquid crystal ND filter 44 is relatively high, that is, T1, an elapsed time until a transmittance reaches from a transmittance V1 to a transmittance V2 of a target is a period of time (t2−t1) as illustrated by a waveform L1 in the upper part of FIG. 2. However, when the temperature of the liquid crystal ND filter 44 is a temperature T2 (<T1) lower than the temperature T1, an elapsed time until the transmittance reaches from the transmittance V1 to the transmittance V2 of the target is a period of time (t3−t1) (>(t2−t1)) as illustrated by a waveform L2 in the upper part of FIG. 2. Further, when the temperature of the liquid crystal ND filter 44 is a temperature T3 (<T2<T1) lower than the temperature T2, an elapsed time until the transmittance reaches from the transmittance V1 to the transmittance V2 of the target is a period of time (t4−t1) (>(t3−t1)>(t2−t1)) as illustrated by a waveform L3 in the upper part of FIG. 2. In other words, the liquid crystal configuring the liquid crystal ND filter 44 increases in viscosity and thus decreases in the response speed as the temperature decreases, and so when the applied voltage is changed to increase from the voltage V12 to the voltage V11, an elapsed time until the transmittance reaches a target level increases.

On the other hand, for example, when an applied voltage is changed from a voltage V11 to a voltage V12 (<V11) and then applied as illustrated by a waveform of an applied voltage at a time t11 in the lower part of FIG. 2, if the temperature of the liquid crystal ND filter 44 is relatively high, that is, T1, an elapsed time until a transmittance reaches from the transmittance V2 to the transmittance V1 of the target is a period of time (t12−t11) as illustrated by a waveform L11 in the upper part of FIG. 2. However, when the temperature of the liquid crystal ND filter 44 is a temperature T2 (<T1) lower than the temperature T1, an elapsed time until the transmittance reaches from the transmittance V2 to the transmittance V1 of the target is a period of time (t13−t11) (>(t12−t11)) as illustrated by a waveform L12 in the upper part of FIG. 2. Further, when the temperature of the liquid crystal ND filter 44 is a temperature T3 (<T2<T1) lower than the temperature T2, an elapsed time until the transmittance reaches from the transmittance V2 to the transmittance V1 of the target is a period of time (t14−t11) (>(t13−t11)>(t12−t11)) as illustrated by a waveform L13 in the upper part of FIG. 2. In other words, the liquid crystal configuring the liquid crystal ND filter 44 increases in viscosity and thus decreases in the response speed as the temperature decreases, and so when the applied voltage is changed to decrease from the voltage V12 to the voltage V11, an elapsed time until the transmittance reaches a target level increases. In addition, when the applied voltage decreases, the response speed decreases greater than when the applied voltage increases. Accordingly, an elapsed time until the transmittance reaches a target level increases. Here, FIG. 2 illustrates characteristics when the liquid crystal ND filter 44 is of a negative type in which the transmittance decreases as the applied voltage increases, but even when the liquid crystal ND filter 44 is of a positive type in which the transmittance increases as the applied voltage increases, the response speed is known to increase as the applied voltage increases.

In the temperature-based transmittance-to-time table 26, a relation among an applied voltage immediately before an applied voltage is applied, an applied voltage to be applied, and the temperature of the liquid crystal ND filter 44 is registered as a table as illustrated in FIG. 2. Here, since it is sufficient if a relation among an applied voltage immediately before an applied voltage is applied, an applied voltage to be applied, and the temperature of the liquid crystal ND filter 44 is obtained, an approximate function capable of calculating a transmittance using such parameters may be obtained and used instead of the temperature-based transmittance-to-time table 26.

The time measuring unit 27 measures an elapsed time from a timing at which an applied voltage is changed and then starts to be applied. The transmittance specifying unit 28 specifies the current transmittance of the liquid crystal ND filter 44 with reference to the temperature-based transmittance-to-time table 26 based on the elapsed time measured by the time measuring unit 27 and the temperature of the liquid crystal ND filter 44 measured by the thermistor 45.

The appropriate transmittance calculating unit 29 calculates an appropriate transmittance settable by the liquid crystal ND filter 44 based on the image signal that has been imaged by the imaging element 46 of the lens barrel 11 and then subjected to certain processing performed by the image processing unit 12.

When the operation detecting unit 21 detects the half push operation or the full push operation, the ND filter control unit 24 controls the transmittance specifying unit 28, specifies a current transmittance, obtains an applied voltage for maintaining the specified transmittance with reference to the transmittance-to-voltage table 25, and applies the applied voltage again. At this time, the gain control unit 22 and the shutter control unit 23 obtain a degree to which the specified transmittance is smaller or larger than the target optimal transmittance, and control either or both of the gain and the shutter speed to compensate for the excess or deficiency. Through this operation, it is possible to reduce the focus lag caused by response characteristics of the liquid crystal ND filter 44.

[Action Control Process by Imaging Device of FIG. 1]

Figure 3:
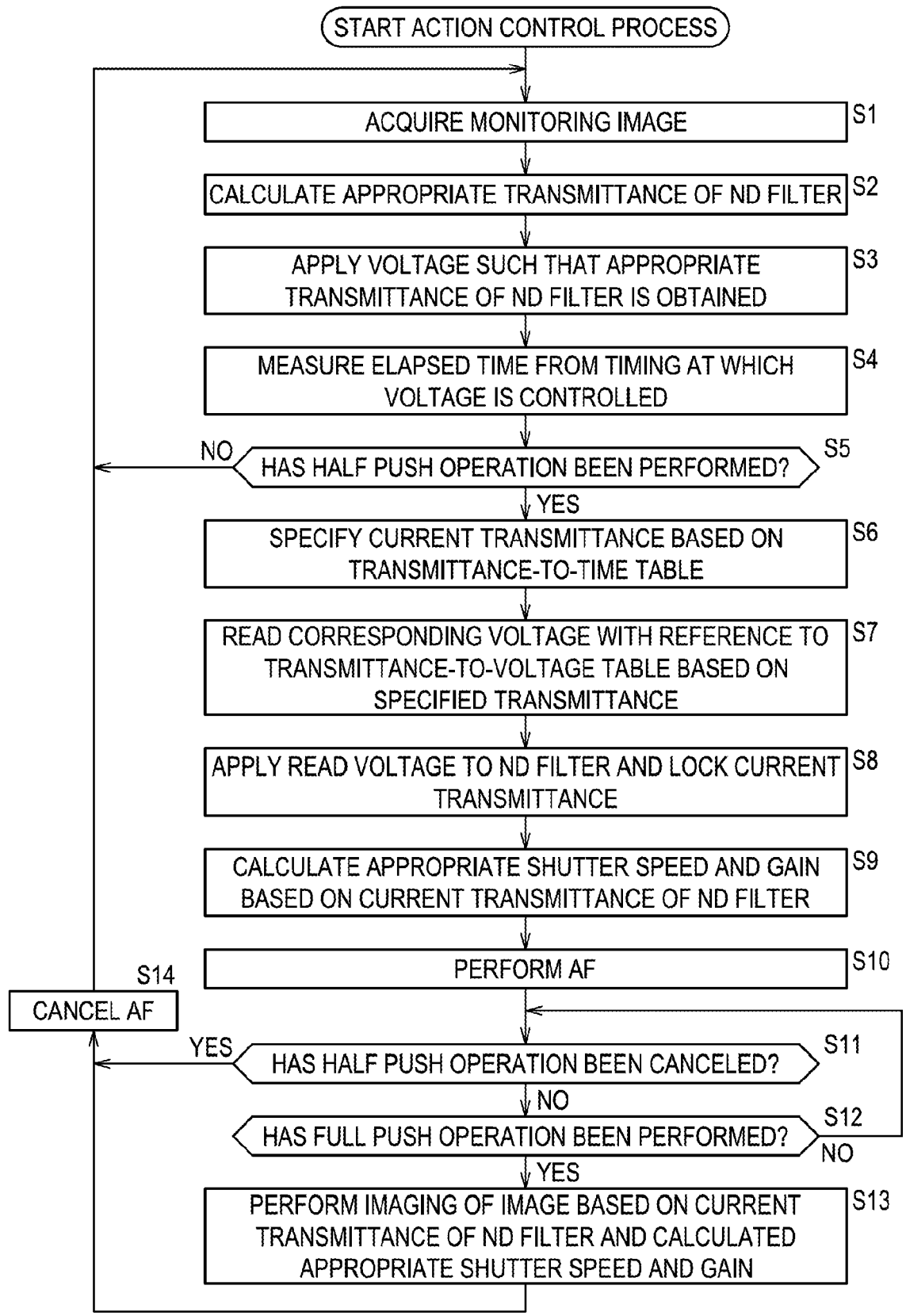
FIG. 3 is a flowchart for describing an action control process performed by the imaging device of FIG. 1.

Next, an action control process performed when the imaging device of FIG. 1 performs imaging will be described with reference to FIG. 3.

In step S1, the control unit 16 controls the imaging element 46 of the lens barrel 11 such that the imaging element 46 images a monitoring image and outputs a monitoring image signal to the image processing unit 12. The image processing unit 12 supplies the monitoring image to the control unit 16 and the display control unit 14. At this time, the display control unit 14 performs certain processing on the image signal of the monitoring image, and causes the resultant data to be displayed on the display unit 15.

In step S2, the control unit 16 controls the appropriate transmittance calculating unit 29 such that the appropriate transmittance calculating unit 29 calculates the transmittance of the liquid crystal ND filter 44 suitable for imaging.

In step S3, the ND filter control unit 24 reads information of an applied voltage for controlling the liquid crystal ND filter 44 such that the liquid crystal ND filter 44 obtains an appropriate transmittance based on information of the appropriate transmittance with reference to the transmittance-to-voltage table 25. Then, the ND filter control unit 24 applies the read voltage used to perform control such that the liquid crystal ND filter 44 has the appropriate transmittance.

In step S4, the time measuring unit 27 measures an elapsed time from a timing at which an applied voltage is changed and applied. At this time, the time measuring unit 27 stores an applied voltage immediately before an applied voltage is changed.

In step S5, the operation detecting unit 21 determines whether the half push operation representing the imaging preparation state has been performed on the operating unit 17. When it is determined in step S5 that the half push operation has not been performed, the process returns to step S1. In other words, until the half push operation is performed, the process of steps S1 to S5 is repeated, the monitoring image is continuously imaged, and the transmittance of the liquid crystal ND filter 44 is controlled so that the appropriate transmittance for obtaining an appropriate light quantity is maintained. In this period, the user views an image displayed on the display unit 15 and can recognize the position imaged by the imaging element 44 of the lens barrel 11. For example, when monitoring starts from a time t0 in FIG. 4 and the transmittance is controlled from a state of V21 to V22 (<V21) at a time t21, an applied voltage is changed at a time t21, and the transmittance reaches a target transmittance V22 at a time t22. Further, as the monitoring state is continued, the target transmittance is set to the transmittance V22 again at a time t23. To this end, the applied voltage is changed, and thus the transmittance gradually increases up to the transmittance V21 of the target from a time t23. Here, the transmittance reaches the transmittance V21 of the target at a time t26 as illustrated by a dotted line in FIG. 4.

Figure 4:
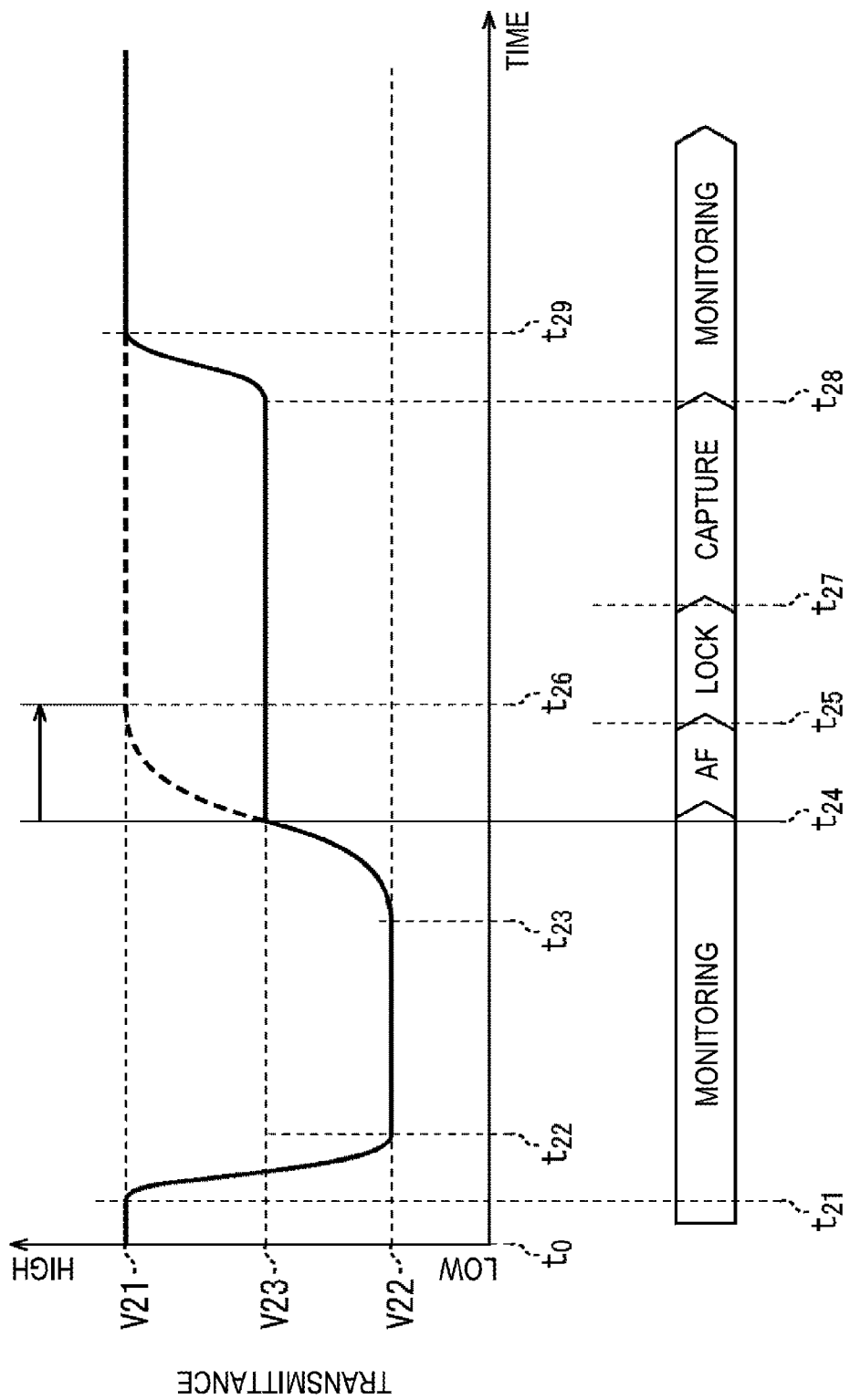
FIG. 4 is a diagram for describing an action control process performed by the imaging device of FIG. 1.

Then, when it is determined in step S5 that the half push operation has been performed by pushing the operating unit 17 halfway and a corresponding operation signal as been generated as illustrated at a time t24 in FIG. 4, the process proceeds to step S6.

In step S6, the control unit 16 controls the transmittance specifying unit 28 such that the transmittance specifying unit 28 specifies the current transmittance of the liquid crystal ND filter 44. More specifically, the transmittance specifying unit 28 controls the time measuring unit 27 and inquires about an elapsed time from a timing at which an applied voltage is changed. The time measuring unit 27 continuously measures an elapsed time from a timing at which an applied voltage is changed while monitoring a change in the applied voltage. Thus, the time measuring unit 27 notifies of an elapsed time from a timing at which an applied voltage is changed at a timing at which an inquiry is received together with an applied voltage at a timing immediately before an applied voltage is changed. Further, the transmittance specifying unit 28 controls the thermistor 45 such that the thermistor 45 measures the current temperature of the liquid crystal ND filter. Then, the transmittance specifying unit 28 specifies the current transmittance of the liquid crystal ND filter 44 based on an elapsed time from a timing at which the notified applied voltage is changed, an applied voltage immediately before an applied voltage is changed, and the temperature measured by the thermistor 45 with reference to the temperature-based transmittance-to-time table 26.

In other words, for example, when the applied voltage changes from V12 to V11 at the time t1, the elapsed time is (tA−t1), and the temperature is T1 as illustrated in the lower part of FIG. 2, the transmittance specifying unit 28 specifies the transmittance V4 as the current transmittance according to the waveform L1 illustrated in the upper part of FIG. 2. Further, for example, when the applied voltage is changed at the time t1, the elapsed time is (tA−t1), and the temperature is T2 as illustrated in the lower part of FIG. 2, the transmittance specifying unit 28 specifies the transmittance V3 as the current transmittance according to the waveform L2 illustrated in the upper part of FIG. 2.

In step S7, the control unit 16 controls the ND filter control unit 24 such that the ND filter control unit 24 reads a voltage by which the state of the current transmittance of the liquid crystal ND filter 44 is maintained with reference to the transmittance-to-voltage table 25. In other words, the applied voltage by which the state of the current transmittance of the liquid crystal ND filter 44 is maintained is an applied voltage corresponding to the transmittance obtained in the process of step S6. In this regard, the ND filter control unit 24 reads information of the applied voltage corresponding to the specified transmittance with reference to the transmittance-to-voltage table 25.

In step S8, the ND filter control unit 24 applies the read applied voltage to the liquid crystal ND filter 44. In other words, for example, as illustrated in FIG. 4, when the transmittance is V23 at the time t24 at which the half push operation is performed, the applied voltage is changed and applied to the liquid crystal ND filter 44 after the time t24 so that the transmittance V23 is maintained, and thus the transmittance of the liquid crystal ND filter 44 is fixed (locked) to the state of the transmittance V23.

In step S9, the gain control unit 22 and the shutter control unit 23 calculate a gain and a shutter speed used to adjust brightness larger or smaller than appropriate brightness based on information of a difference between the current transmittance and the appropriate transmittance.

Figure 5:
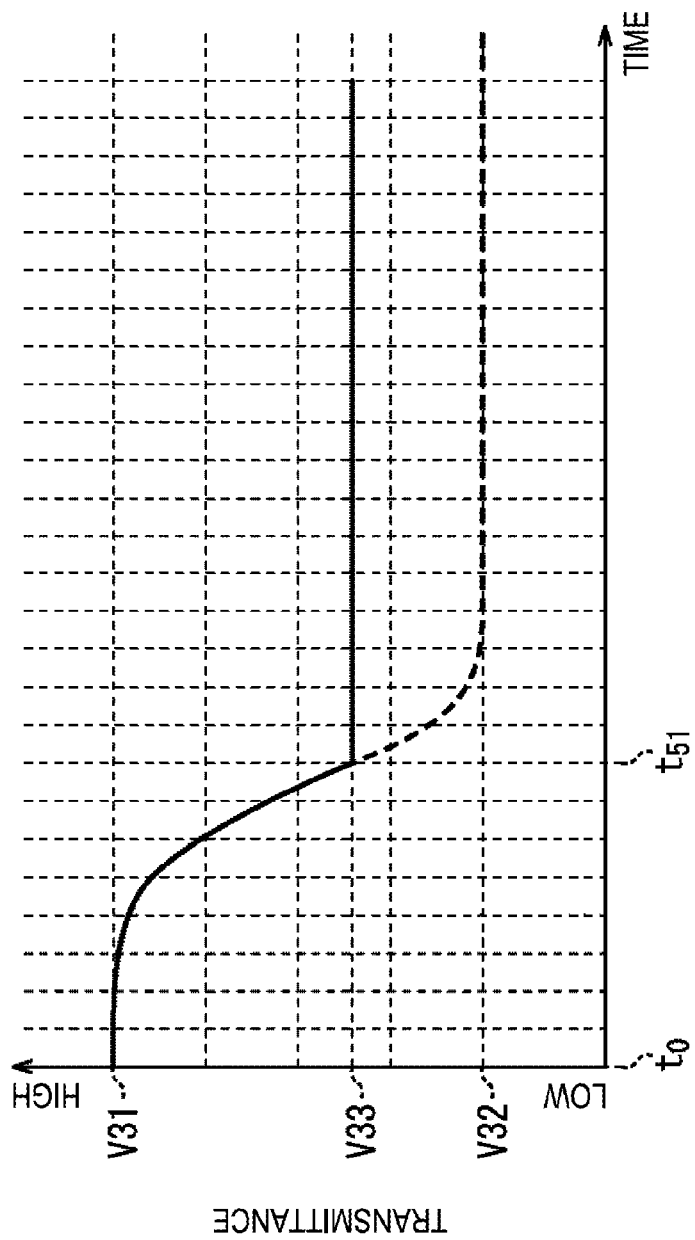
FIG. 5 is a diagram for describing control performed such that a transmittance of a liquid crystal ND filter at a timing at which a half push operation is performed is maintained.

In other words, for example, as illustrated in FIG. 5, the appropriate transmittance is a transmittance V32, the transmittance gradually changes from V31 as the applied voltage is changed at a time t0, and the transmittance reaches a transmittance 33 (>transmittance 32) rather than the transmittance V31 as the half push operation is performed at a time t51. In this case, the transmittance can be considered to be larger than the appropriate transmittance V32 of the target by (V33−V32).

Figure 6:
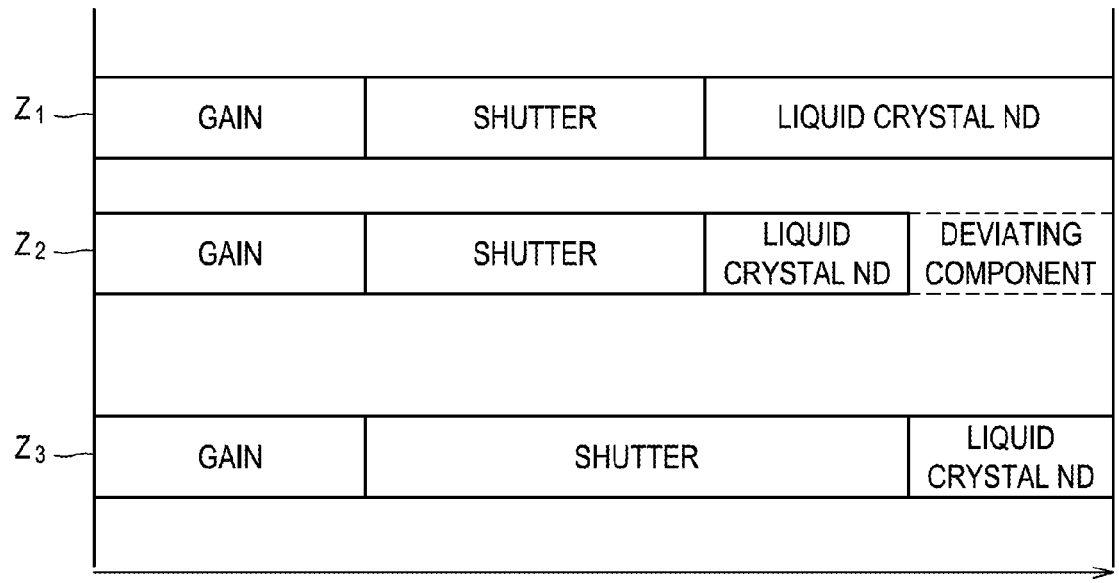
FIG. 6 is a diagram for describing an example in which brightness that is difficult to control by maintaining a transmittance of a liquid crystal ND filter is adjusted based on a gain and a shutter speed.

When the transmittance of the liquid crystal ND filter 44 reaches the appropriate transmittance V32, the gain and the shutter speed of the imaging element 46 and the transmittance of the liquid crystal ND filter 44 are appropriately adjusted as illustrated in a state Z1 in FIG. 6, and thus the imaging element 46 can image an image having appropriate brightness. However, in the state illustrated in FIG. 5, since a parameter of brightness to be adjusted by the transmittance of the liquid crystal ND filter 44 does not have an appropriate value as described above as illustrated in a state Z2 of FIG. 6, a component that deviates from appropriate brightness is included, and thus it is difficult to perform imaging with appropriate brightness.

In this regard, in the process of step S9, for example, as illustrated in a state Z3 of FIG. 6, a deviating component that is in an insufficient state by the parameter of brightness to be adjusted by the transmittance of the liquid crystal ND filter 44 is compensated by the shutter speed of the imaging element 46. Here, FIG. 6 illustrates the example in which the deviating component that is in an insufficient state by the parameter of brightness to be adjusted by the transmittance of the liquid crystal ND filter 44 becomes the appropriate brightness as a whole by adjusting the parameter of the shutter speed. However, appropriate brightness may be obtained as a whole by controlling a parameter for adjusting the gain, or appropriate brightness may be obtained as a whole by adjusting both parameters.

In step S10, the control unit 16 controls the focus lens 43 such that the focus lens 43 performs an AF operation so that a state in which the subject image is formed in the imaging element 46 is set.

In step S11, the operation detecting unit 21 determines whether the half push operation has been canceled based on the operation signal of the operating unit 17. For example, when it is determined in step S11 that the half push operation has been canceled, the process proceeds to step S14, the AF is canceled, and then the process returns to step S1. In other words, in this case, the process returns to the monitoring state.

However, when it is determined in step S11 that the half push operation has not been canceled, in step S12, the operation detecting unit 21 determines whether the full push operation representing the imaging instruction has been performed based on the operation signal of the operating unit 17. When it is determined that the full push operation has not been performed, the process returns to step S11. In other words, when the half push operation state is continued, the process of steps S11 and S12 is repeated.

Further, when it is determined in step S12 that the full push operation has been performed as illustrated at a time t27 of FIG. 4, the process proceeds to step S13.

In step S13, the gain control unit 22 and the shutter control unit 23 control the imaging element 46 such that the imaging element 46 images an image with the appropriate gain and the appropriate shutter speed obtained in the process of step S10, and then the process proceeds to step S14. Through this process, for example, as illustrated at the times t27 to t28 of FIG. 4, the imaging element 46 images (captures) an image, and supplies the captured image to the image processing unit 12 as an image signal. After this process, the process returns to the monitoring process as illustrated after the time t28. Here, FIG. 4 illustrates the example in which, after the time t28, the applied voltage returns to the state at the time t23, and the transmittance reaches V21 at a time t29.

Through the above process, the liquid crystal ND filter 44 has the appropriate transmittance as illustrated at the time t23 of FIG. 4, and thus, after the applied voltage is changed, even when the focus adjustment is locked in the inappropriate transmittance state as the half push operation is performed at the time t24 that is a timing before the time t26 at which the appropriate transmittance is obtained, the transmittance is fixed in this state, and it is possible to adjust brightness that is difficult to adjust in that transmittance by adjusting the gain or the shutter speed and then perform imaging.

As a result, it is possible to suppress a focus lag that occurs as the response speed of the transmittance does not follow the applied voltage applied to the liquid crystal ND filter 44.

The above description has been made in connection with the example in which the liquid crystal ND filter is used as an example of the ND filter, but ND filters of various structures may be used as long as the ND filter changes a transmittance according to an applied voltage. Further, the liquid crystal ND filter of the negative type has been described as an example of the ND filter, but the liquid crystal ND filter of the positive type may be used. Further, the temperature characteristic of the liquid crystal ND filter has been considered as an example of response characteristics, but a parameter having an influence on the response characteristics other than the temperature may be considered.

2. Second Embodiment

Exemplary Configuration of Imaging Device According to Second Embodiment of Present Technology The above description has been made in connection with the example in which the transmittance is specified at a timing at which the half push operation is performed based on an elapsed time from a timing at which an applied voltage is applied to the liquid crystal ND filter and the temperature of the liquid crystal ND filter with reference to the transmittance-to-time table, and a gain and a shutter speed for adjusting an applied voltage for maintaining the specified transmittance and a difference with a target transmittance, that is, a difference with brightness to be adjusted by the liquid crystal ND filter, are calculated. However, as the transmittance at the timing at which the half push operation is performed, the transmittance of the liquid crystal ND filter may be measured at the corresponding timing and used.

Figure 7:
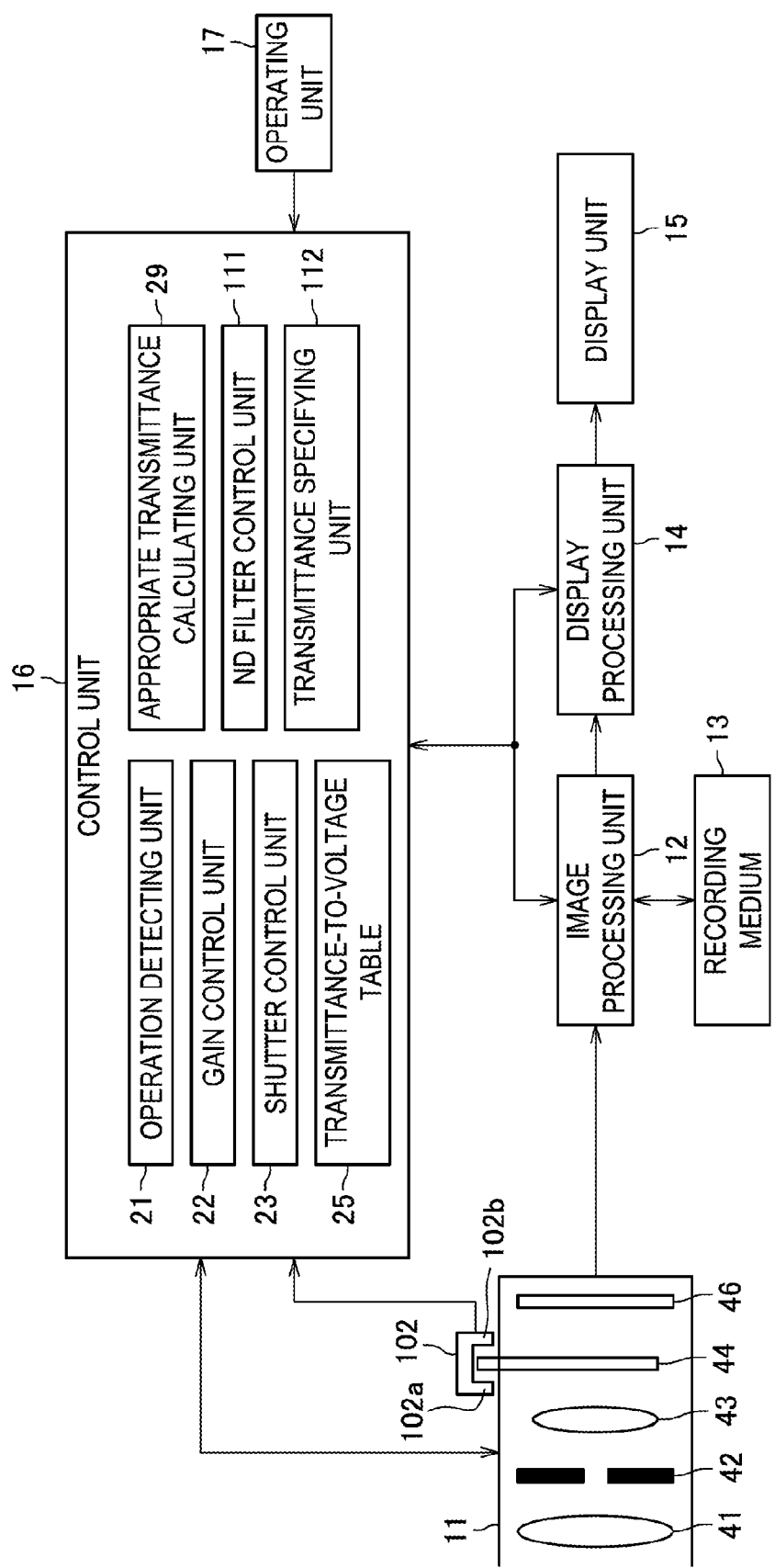
FIG. 7 is a diagram illustrating an exemplary configuration of an imaging device according to a second embodiment of the present technology.

FIG. 7 illustrates an exemplary configuration of a second embodiment of an imaging device that is configured to measure and use the transmittance of the liquid crystal ND filter at a timing at which the half push operation is performed. In the imaging device of FIG. 7, components having the same function as the components of the imaging device of FIG. 1 have the same names and are denoted by the same reference numerals, and thus a description thereof will be appropriately omitted.

In other words, the imaging device of FIG. 7 differs from the imaging device of FIG. 1 in that a liquid crystal ND filter 101 and a light quantity measuring unit 102 are provided instead of the liquid crystal ND filter 44 and the thermistor 45. Further, the control unit 16 includes an ND filter control unit 111 and a transmittance specifying unit 112 instead of the ND filter control unit 24, the temperature-based transmittance-to-time table 26, the time measuring unit 27, and the transmittance specifying unit 28. The liquid crystal ND filter 101 has basically the same function as the liquid crystal ND filter 24 but is configured to have a portion protruding from the inner diameter of the lens barrel 11. Further, the light quantity measuring unit 102 includes measuring units 102a and 102b that are configured such that the portion of the liquid crystal ND filter 101 protruding from the lens barrel 111 is interposed therebetween, and that measure light quantities of a front portion and a rear portion of the liquid crystal ND filter 101, and supply the light quantities measured at the respective positions to the control unit 16. In other words, the measuring unit 102a of the light quantity measuring unit 102 installed in front of the liquid crystal ND filter 101 measures a light quantity before light is incident on the liquid crystal ND filter 101. Further, the measuring unit 102b of the light quantity measuring unit 102 installed behind the liquid crystal ND filter 101 measures a light quantity after light is incident on the liquid crystal ND filter 101.

The ND filter control unit 111 is basically the same as the ND filter control unit 24, but uses a value specified by the transmittance specifying unit 112 as the transmittance of the liquid crystal ND filter 101 at a timing at which the half push operation is performed. The transmittance specifying unit 112 calculates and specifies a transmittance based on a ratio of the light quantities of the front and rear portions of the liquid crystal ND filter 101 which are supplied from the light quantity measuring unit 102.

[Action Control Process by Imaging Device of FIG. 7]

Figure 8:
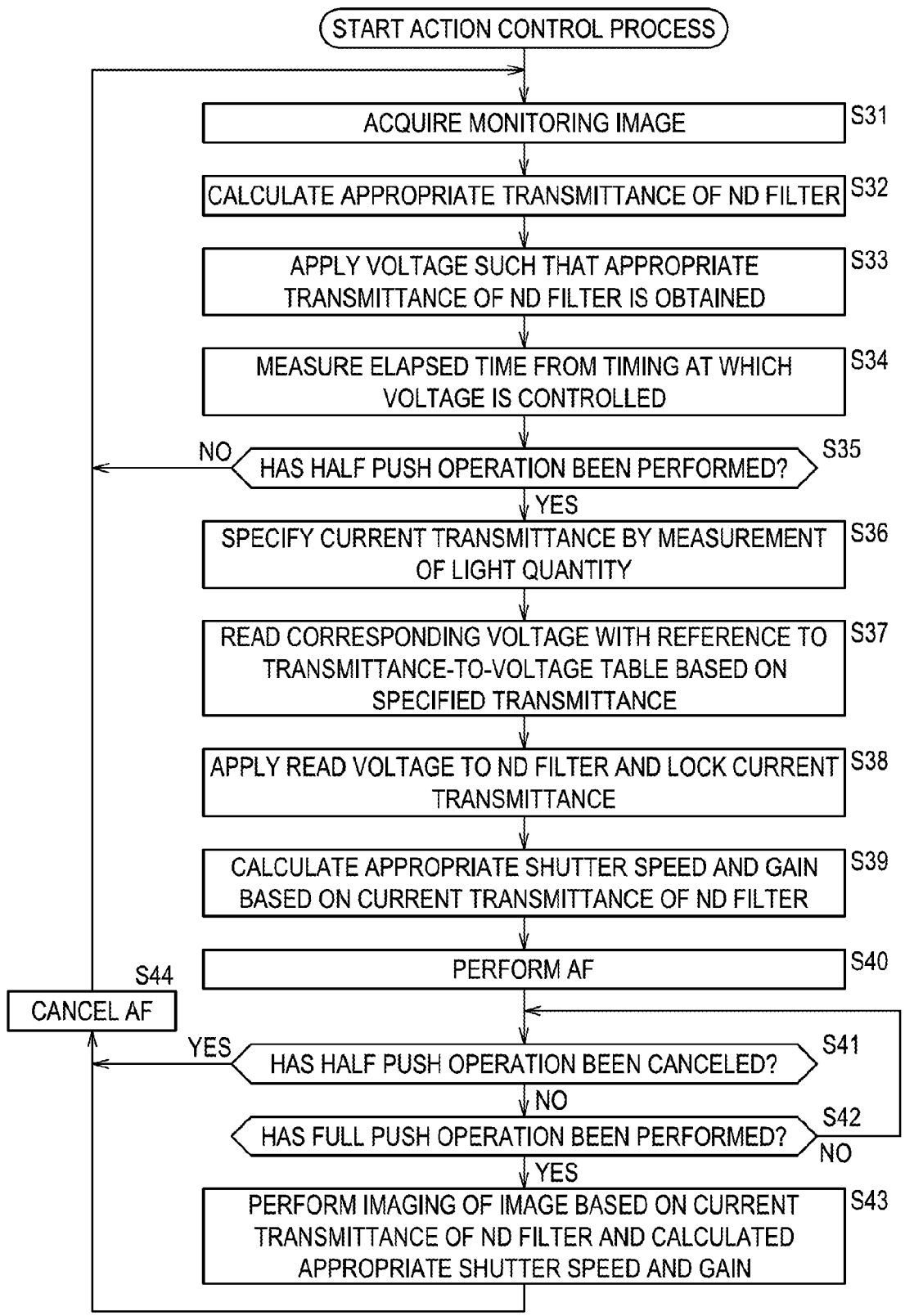
FIG. 8 is a flowchart for describing an action control process performed by the imaging device of FIG. 7.

Next, an action control process performed when the imaging device of FIG. 7 performs imaging will be described with reference to a flowchart of FIG. 8. The flowchart of FIG. 8 other than step S36 is identical to the flowchart of FIG. 3 in the process of steps S1 to S5 and steps S7 to S14, and thus a description thereof will be omitted.

In other words, in the process of steps S31 to S35, a monitoring image is imaged, and the same process is repeated until the half push operation is performed. Then, when it is determined in step S35 that the half push operation has been performed, the process proceeds to step S36.

In step S36, the transmittance specifying unit 112 calculates the ratio of the light quantities of the front and rear portions of the liquid crystal ND filter 44 measured by the light quantity measuring unit 102, and specifies the current transmittance of the liquid crystal ND filter.

Then, in step S37, the ND filter control unit 111 reads the applied voltage corresponding to the specified transmittance of the liquid crystal ND filter 44 from the transmittance-to-voltage table 25, and in step S38, the read applied voltage is applied to the liquid crystal ND filter, and the transmittance at a timing at which the half push operation has been performed is locked. Then, in step S39, a gain and a shutter speed used to adjust brightness that is difficult to adjust by the liquid crystal ND filter 101 are calculated based on the difference between the transmittance at a timing at which the half push operation has been performed and the target transmittance, and then the AF is performed in step S40. Lastly, when the operating unit 17 is pushed fully so that an imaging instruction is given in step S42, in step S43, an image is imaged based on the transmittance of the liquid crystal ND filter at a timing at which the half push operation has been performed and the gain and the shutter speed calculated by the process of step S39.

Through the above process, the imaging device of FIG. 1 directly measures the transmittance of the liquid crystal ND filter 44 at a timing at which the operating unit is pushed halfway and obtains an accurate transmittance, and thus it is possible to calculate an applied voltage to be applied to the liquid crystal ND filter with a high degree of accuracy. Further, since the transmittance of the liquid crystal ND filter 44 at a timing at which the half push operation is performed is accurately obtained, a gain and a shutter speed used to adjust brightness that is difficult to adjust by the liquid crystal ND filter can be controlled with a high degree of accuracy.

Accordingly, it is possible to reduce a focus lag that occurs as the response speed of the transmittance does not follow the applied voltage applied to the liquid crystal ND filter.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 9 is a block diagram showing a hardware configuration example of a computer that performs the above-described series of processing using a program.

In the computer, a central processing unit (CPU) 1001, a read only memory (ROM) 1002 and a random access memory (RAM) 1003 are mutually connected by a bus 1004.

An input/output interface 1005 is also connected to the bus 1004. An input unit 1006, an output unit 1007, a storage unit 1008, a communication unit 1009, and a drive 1010 are connected to the input/output interface 1005.

The input unit 1006 is configured from a keyboard, a mouse, a microphone or the like. The output unit 1007 is configured from a display, a speaker or the like. The storage unit 1008 is configured from a hard disk, a non-volatile memory or the like. The communication unit 1009 is configured from a network interface or the like. The drive 1010 drives a removable medium 1011 such as a magnetic disk, an optical disk, a magneto-optical disk, a semiconductor memory or the like.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

Then, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

Further, each step described by the above mentioned flow charts can be executed by one apparatus or by allocating a plurality of apparatuses.

Additionally, the present technology may also be configured as below.

(1)

An action control device, including:

a transmittance specifying unit configured to specify a transmittance of a variable-transmittance neutral density (ND) filter having a transmittance that varies according to an applied voltage; and an applied voltage control unit configured to control a voltage to be applied to the variable-transmittance ND filter such that the transmittance specified by the transmittance specifying unit is obtained;

wherein the applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given.

(2)

The action control device according to (1), further including:

an imaging unit configured to image an image through the variable-transmittance ND filter;

a transmittance calculating unit configured to calculate an appropriate transmittance of the variable-transmittance ND filter based on brightness of the image imaged by the imaging unit; and an applied voltage storage unit configured to store an applied voltage corresponding to a transmittance of the variable-transmittance ND filter, wherein the applied voltage control unit performs control such that, among applied voltages stored in the applied voltage storage unit, an applied voltage corresponding to the appropriate transmittance calculated by the transmittance calculating unit is applied to the variable-transmittance ND filter.

(3)

The action control device according to (1) or (2), further including:

an operating unit configured to be operated when an imaging preparation instruction or an imaging instruction for an image to be imaged by the imaging unit is given, wherein the transmittance specifying unit specifies a transmittance at a certain timing after the applied voltage control unit starts to apply the applied voltage to the variable-transmittance ND filter, and wherein the applied voltage control unit performs control such that, among applied voltages that are stored in the applied voltage storage unit and correspond to transmittances of the variable-transmittance ND filter, an applied voltage corresponding to the transmittance specified by the transmittance specifying unit is applied to the variable-transmittance ND filter at a timing at which an operation to give the imaging preparation instruction is performed on the operating unit.

(4)

The action control device according to any one of (1) to (3), further including:

a response characteristic data storage unit configured to store response characteristic data of a transmittance of the variable-transmittance ND filter that occurs in time series until control from a second voltage from which control of an applied voltage starts to a first voltage is completed when the applied voltage control unit controls the applied voltage to be the first voltage; and an elapsed time measuring unit configured to measure an elapsed time that has elapsed after the applied voltage control unit starts to control the applied voltage, wherein the transmittance specifying unit specifies a transmittance corresponding to an elapsed time that has elapsed until the operation to give the imaging preparation instruction is performed on the operating unit after the applied voltage control unit starts to apply the applied voltage to the variable-transmittance ND filter, as a transmittance at the timing at which the operation to give the imaging preparation instruction is performed on the operating unit, based on the elapsed time measured by the elapsed time measuring unit and the response characteristic data stored in the response characteristic data storage unit.

(5)

The action control device according to any one of (1) to (4), further including:

a temperature measuring unit configured to measure a temperature of the variable-transmittance ND filter, wherein the response characteristic data storage unit stores response characteristic data of a transmittance of the variable-transmittance ND filter that occurs in time series until control from a second voltage from which control of an applied voltage starts to a first voltage is completed when the applied voltage control unit controls the applied voltage to be the first voltage for each temperature of the variable-transmittance ND filter, and wherein the transmittance specifying unit specifies a transmittance corresponding to an elapsed time that has elapsed until the operation to give the imaging preparation instruction is performed on the operating unit after the applied voltage control unit starts to apply the applied voltage to the variable-transmittance ND filter, as a transmittance at the timing at which the operation to give the imaging preparation instruction is performed on the operating unit, based on the elapsed time measured by the elapsed time measuring unit, the response characteristic data stored in the response characteristic data storage unit, and the temperature of the variable-transmittance ND filter measured by the temperature measuring unit.

(6)

The action control device according to any one of (1) to (3), further including:

a light quantity measuring unit configured to measure light quantities of front and rear portions of the variable-transmittance ND filter, wherein the transmittance specifying unit specifies a transmittance at the timing at which the operation to give the imaging preparation instruction is performed on the operating unit after the applied voltage control unit starts to apply the applied voltage to the variable-transmittance ND filter, based on the light quantities of the front and rear portions of the variable-transmittance ND filter measured by the light quantity measuring unit.

(7)

The action control device according to any one of (1) to (6), further including:

a gain control unit configured to control a gain of an image to be imaged by the imaging unit; and a shutter control unit configured to control a light blocking speed for blocking light incident on the imaging unit at a timing at which an image is imaged by the imaging unit, wherein the gain of the imaging unit and the light blocking speed, or either of them are controlled by the gain control unit and the shutter control unit so that optimal brightness is obtained when brightness based on the transmittance acquired by the transmittance specifying unit is higher or lower than optimal brightness at which the imaging unit images an image.

(8)

The action control device according to any one of (1) to (7), wherein the variable-transmittance ND filter is a liquid crystal ND filter.

(9)

The action control device according to any one of (1) to (8), wherein the transmittance of the variable-transmittance ND filter increases or decreases as the applied voltage increases.

(10)

An action control method of an action control device, including:

a step of performing a transmittance specifying process of specifying a transmittance of a variable-transmittance neutral density (ND) filter having a transmittance that varies according to an applied voltage; and a step of performing an applied voltage control process of controlling a voltage to be applied to the variable-transmittance ND filter such that the transmittance acquired in the transmittance specifying process is obtained;

wherein the applied voltage control process controls the voltage to be applied to the variable-transmittance ND filter such that the transmittance of the variable-transmittance ND filter specified by the transmittance specifying process is maintained at a timing at which an imaging preparation instruction or an imaging instruction is given.

(11)

A program causing a computer to function as:

a transmittance specifying unit configured to specify a transmittance of a variable-transmittance neutral density (ND) filter having a transmittance that varies according to an applied voltage; and an applied voltage control unit configured to control a voltage to be applied to the variable-transmittance ND filter such that the transmittance specified by the transmittance specifying unit is obtained;

wherein the applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given.

(12)

An imaging device, including:

a transmittance specifying unit configured to specify a transmittance of a variable-transmittance neutral density (ND) filter having a transmittance that varies according to an applied voltage; and an applied voltage control unit configured to control a voltage to be applied to the variable-transmittance ND filter such that the transmittance specified by the transmittance specifying unit is obtained;

wherein the applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given.

REFERENCE SIGNS LIST

11 lens barrel
12 image processing unit
13 recording medium 14 display processing unit
15 display unit
16 control unit
17 operating unit
21 operation detecting unit
22 gain control unit
23 shutter control unit
24 ND filter control unit
25 transmittance-to-voltage table
26 temperature-based transmittance-to-time table
27 time measuring unit
28 transmittance specifying unit
29 appropriate transmittance calculating unit
41 zoom lens
42 diaphragm
43 focus lens
44 liquid crystal ND filter
45 thermistor
46 imaging element
101 liquid crystal ND filter
102 light quantity measuring unit
102a, 102b measuring unit
111 ND filter
112 transmittance specifying unit

The invention claimed is:

1. An action control device, comprising:
    a transmittance specifying unit configured to specify a transmittance of a variable-transmittance neutral density (ND) filter having a transmittance that varies according to an applied voltage; and
    an applied voltage control unit configured to control a voltage to be applied to the variable-transmittance ND filter such that the transmittance specified by the transmittance specifying unit is obtained;
    wherein the applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given; and
    wherein the transmittance specifying unit specifies a transmittance corresponding to an elapsed time that has elapsed until the imaging instruction is given after the applied voltage control unit starts to apply the applied voltage to the variable-transmittance ND filter.

2. The action control device according to claim 1, further comprising:
    an imaging unit configured to image an image through the variable-transmittance ND filter;
    a transmittance calculating unit configured to calculate an appropriate transmittance of the variable-transmittance ND filter based on brightness of the image imaged by the imaging unit; and
    an applied voltage storage unit configured to store an applied voltage corresponding to a transmittance of the variable-transmittance ND filter,
    wherein the applied voltage control unit performs control such that, among applied voltages stored in the applied voltage storage unit, an applied voltage corresponding to the appropriate transmittance calculated by the transmittance calculating unit is applied to the variable-transmittance ND filter.

3. The action control device according to claim 2, further comprising:
    an operating unit configured to be operated when an imaging preparation instruction or an imaging instruction for an image to be imaged by the imaging unit is given,
    wherein the transmittance specifying unit specifies a transmittance at a certain timing after the applied voltage control unit starts to apply the applied voltage to the variable-transmittance ND filter, and
    wherein the applied voltage control unit performs control such that, among applied voltages that are stored in the applied voltage storage unit and correspond to transmittances of the variable-transmittance ND filter, an applied voltage corresponding to the transmittance specified by the transmittance specifying unit is applied to the variable-transmittance ND filter at a timing at which an operation to give the imaging preparation instruction is performed on the operating unit.

4. The action control device according to claim 3, further comprising:
    a response characteristic data storage unit configured to store response characteristic data of a transmittance of the variable-transmittance ND filter that occurs in time series until control from a second voltage from which control of an applied voltage starts to a first voltage is completed when the applied voltage control unit controls the applied voltage to be the first voltage; and
    an elapsed time measuring unit configured to measure an elapsed time that has elapsed after the applied voltage control unit starts to control the applied voltage.

5. The action control device according to claim 4, further comprising:
    a temperature measuring unit configured to measure a temperature of the variable-transmittance ND filter,
    wherein the response characteristic data storage unit stores response characteristic data of a transmittance of the variable-transmittance ND filter that occurs in time series until control from a second voltage from which control of an applied voltage starts to a first voltage is completed when the applied voltage control unit controls the applied voltage to be the first voltage for each temperature of the variable-transmittance ND filter, and
    wherein the transmittance specifying unit specifies a transmittance corresponding to an elapsed time that has elapsed until the operation to give the imaging preparation instruction is performed on the operating unit after the applied voltage control unit starts to apply the applied voltage to the variable-transmittance ND filter, as a transmittance at the timing at which the operation to give the imaging preparation instruction is performed on the operating unit, based on the elapsed time measured by the elapsed time measuring unit, the response characteristic data stored in the response characteristic data storage unit, and the temperature of the variable-transmittance ND filter measured by the temperature measuring unit.

6. The action control device according to claim 3, further comprising:
    a light quantity measuring unit configured to measure light quantities of front and rear portions of the variable-transmittance ND filter,
    wherein the transmittance specifying unit specifies a transmittance at the timing at which the operation to give the imaging preparation instruction is performed on the operating unit after the applied voltage control unit starts to apply the applied voltage to the variable-transmittance ND filter, based on the light quantities of the front and rear portions of the variable-transmittance ND filter measured by the light quantity measuring unit.

7. The action control device according to claim 1, further comprising:
- a gain control unit configured to control a gain of an image to be imaged by the imaging unit; and
- a shutter control unit configured to control a light blocking speed for blocking light incident on the imaging unit at a timing at which an image is imaged by the imaging unit,
- wherein the gain of the imaging unit and the light blocking speed, or either of them are controlled by the gain control unit and the shutter control unit so that optimal brightness is obtained when brightness based on the transmittance acquired by the transmittance specifying unit is higher or lower than optimal brightness at which the imaging unit images an image.

8. The action control device according to claim 1, wherein the variable-transmittance ND filter is a liquid crystal ND filter.

9. The action control device according to claim 1, wherein the transmittance of the variable-transmittance ND filter increases or decreases as the applied voltage increases.

10. An action control method of an action control device, comprising:
- a step of performing a transmittance specifying process of specifying a transmittance of a variable-transmittance neutral density (ND) filter having a transmittance that varies according to an applied voltage; and
- a step of performing an applied voltage control process of controlling a voltage to be applied to the variable-transmittance ND filter such that the transmittance acquired in the transmittance specifying process is obtained;
- wherein the applied voltage control process controls the voltage to be applied to the variable-transmittance ND filter such that the transmittance of the variable-transmittance ND filter specified by the transmittance specifying process is maintained at a timing at which an imaging preparation instruction or an imaging instruction is given; and
- wherein the transmittance specifying process specifies a transmittance corresponding to an elapsed time that has elapsed until the imaging instruction is given after the applied voltage control process starts to apply the applied voltage to the variable-transmittance ND filter.

11. A non-transitory computer readable medium on which is stored a program, which when implemented by a computer, causes the computer to function as:
- a transmittance specifying unit configured to specify a transmittance of a variable-transmittance neutral density (ND) filter having a transmittance that varies according to an applied voltage; and
- an applied voltage control unit configured to control a voltage to be applied to the variable-transmittance ND filter such that the transmittance specified by the transmittance specifying unit is obtained;
- wherein the applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given; and
- wherein the transmittance specifying unit specifies a transmittance corresponding to an elapsed time that has elapsed until the imaging instruction is given after the applied voltage control unit starts to apply the applied voltage to the variable-transmittance ND filter.

12. An imaging device, comprising:
- a transmittance specifying unit configured to specify a transmittance of a variable-transmittance neutral density (ND) filter having a transmittance that varies according to an applied voltage; and
- an applied voltage control unit configured to control a voltage to be applied to the variable-transmittance ND filter such that the transmittance specified by the transmittance specifying unit is obtained;
- wherein the applied voltage control unit controls the voltage to be applied to the variable-transmittance ND filter such that the transmittance of the variable-transmittance ND filter specified by the transmittance specifying unit is maintained at a timing at which an imaging preparation instruction or an imaging instruction is given; and
- wherein the transmittance specifying unit specifies a transmittance corresponding to an elapsed time that has elapsed until the imaging instruction is given after the applied voltage control unit starts to apply the applied voltage to the variable-transmittance ND filter.

\* \* \* \* \*